(12) United States Patent
Loodberg

(10) Patent No.: US 8,181,502 B2
(45) Date of Patent: May 22, 2012

(54) METHOD OF CALIBRATING MEASUREMENT SYSTEMS

(75) Inventor: Pål Loodberg, Göteborg (SE)

(73) Assignee: AB Volvo Penta, Göteborg (SE)

( * ) Notice: Subject to any disclaimer, the term of this patent is extended or adjusted under 35 U.S.C. 154(b) by 739 days.

(21) Appl. No.: 12/094,821

(22) PCT Filed: Nov. 23, 2005

(86) PCT No.: PCT/SE2005/001761
§ 371 (c)(1),
(2), (4) Date: Mar. 14, 2009

(87) PCT Pub. No.: WO2007/061343
PCT Pub. Date: May 31, 2007

(65) Prior Publication Data
US 2009/0260414 A1  Oct. 22, 2009

(51) Int. Cl.
*G01F 19/00* (2006.01)
(52) U.S. Cl. .......................................... 73/1.73
(58) Field of Classification Search .................. None
See application file for complete search history.

(56) References Cited

U.S. PATENT DOCUMENTS

| | | | |
|---|---|---|---|
| 4,406,152 A | 9/1983 | Palmer et al. | |
| 5,303,585 A | 4/1994 | Lichte | |
| 2004/0117135 A1 | 6/2004 | Rogers | |

FOREIGN PATENT DOCUMENTS

| | | |
|---|---|---|
| EP | 0310298 A | 4/1989 |
| JP | 2002202174 A | 11/2002 |
| WO | 9514217 A | 5/1995 |
| WO | 2004068082 A1 | 8/2004 |

OTHER PUBLICATIONS

International Search Report from corresponding International Application PCT/SE2005/001761.
International Preliminary Report on Patentability from corresponding International Application PCT/SE2005/001761.
Supplementary European Search Report from corresponding EP 05804700.

*Primary Examiner* — Hezron E Williams
*Assistant Examiner* — Alex Devito
(74) *Attorney, Agent, or Firm* — WRB-IP LLP

(57) ABSTRACT

There is provided a method of calibrating a measurement system for measuring a position (h) of a meniscus of a liquid fuel included within a marine fuel tank and therefrom generating a corresponding content signal indicative of a proportion of the tank filled with fuel. The method includes steps of: (a) from a first time instance when the tank is substantially empty, filling during a calibration phase the tank with the fuel at a substantially constant rate whilst simultaneously recording corresponding values (h(t)) of a meniscus position indicative signal generated by the measurement system; (b) at a second time instance after said first time instance, terminating filling of the tank with fuel when the position indicative signal corresponds to the tank being substantially filled with fuel; and (c) subsequently, after the calibration phase, applying signal processing to the position indicative signal to generate the content signal indicative of the proportion of the tank filled with fuel, the signal processing accounting for the tank during the calibration phase being filled at the substantially constant rate.

14 Claims, 3 Drawing Sheets

METHOD OF CALIBRATING MEASUREMENT SYSTEMS

BACKGROUND AND SUMMARY

The present invention relates to methods of calibrating measurement systems, for example to methods of calibrating measurement systems for measuring fuel levels in fuel tanks such as marine fuel tanks. Moreover, the present invention is concerned with measurements systems operable according to these methods. Furthermore, the present invention also concerns software executable on computing hardware for executing these methods.

Methods of calibrating measurement systems operable to measure liquid levels in containers and thereby determining a proportion of the container filled with liquid are known. For example, road vehicles such as automobiles contemporarily include fuel measurement systems for providing drivers of such vehicles with information regarding remaining fuel in fuel tanks of the vehicles.

Moreover, such vehicles are often mass produced items whose tanks are often of relatively simple and predictable shape and can be pre-characterized during initial design of such vehicles; namely, a mathematic relationship between a height of a meniscus of liquid fuel in such a tank to a volumetric proportion of the tank filled with fuel is known and predictable for road vehicles of a given design.

A problem arises in marine vessels on account of a lesser degree of standardization being encountered in comparison to products such as road vehicles which are subject to relatively large production runs of a given design of vehicle. Fuel and water tanks in marine vessels can be of highly complex and potentially variable shape as elucidated in a published United States patent application no. US2004/0149003. In this application, it is disclosed that a contained volume in a marine vessel tank is rarely uniform with respect to any axis, and especially with respect to a vertical axis along which conventional float-based fluid gauges operate. A consequence of such non-uniformity is that movement of the float gauge is rarely a direct indication of a quantity of liquid, for example fuel or water, input to or extracted from the marine vessel tank; such lack of accurate indication by such float-based fluid gauges is a technical problem that the present invention seeks to address.

The technical problem is further confounded when flexible bladder-style tanks are used on marine vessels, for example yachts, to fit within highly complex and irregular spaces provided within such marine vessels; such flexible tanks are able to assume a shape of the space into which they are introduced.

The aforementioned published patent application no. US2004/0149003 discloses a method of accommodating ascertainment of fill characteristics of fluid tanks on marine vessels. The method includes a first step of providing an experientially-based mapping of volume characteristics of a fluid tank positioned on a marine vessel, the correlation being correlated with respect to measurable fluid surface positions within the fluid tank. Moreover, the method includes a second step of outputting fluid fill condition information for operator use based on quantification of a parameter other than sensed fluid level in the fluid tank based on a function of that other parameter being compared to the experientially-based mapping function. In practice, the method makes use of a fuel dispenser, namely a volumetric measuring dispenser operable to measure and report a volume of fluid dispensed into an interior volume of the tank.

The method described in the aforesaid published patent application is found to be potentially awkward and inconvenient to employ in practice, especially if the tank is modified frequently by occasionally coupling one or more supplementary tanks thereto or by movement of the tank when implemented in flexible form to conform to given available space.

Thus, the present invention is concerned with providing an at least partial solution to the aforesaid technical problem by providing a more straightforward and readily-applicable method of calibrating measurement systems such as liquid level measurement systems for marine vessels.

It is desirable to provide a method of calibrating measuring systems such as liquid measuring systems.

According to a first aspect of the invention, there is provided a method of calibrating a measurement system operable to measure a spatial position of a meniscus of a liquid included within a container and therefrom generating a corresponding liquid content signal indicative of a proportion of the container filled with the liquid, said method including steps of:

(a) from a first time instance when said container is in a first state including a first quantity of said liquid, progressively filling during a calibration phase said container with the liquid at a substantially constant rate of liquid delivery whilst periodically simultaneously recording corresponding generated values of a meniscus position indicative signal generated by said measurement system;

(b) at a second time instance after said first time instance during said calibration phase, terminating progressive filling of said container with said liquid when said position indicative signal corresponds to the container being in a second state including a second quantity of said liquid; and (c) subsequently, in normal use after said calibration phase, applying signal processing to said position indicative signal provided from the measurement system to generate said corresponding liquid content signal indicative of said proportion of the container filled with the liquid, said signal processing accounting for said container during said calibration phase having been filled at the substantially constant rate of liquid delivery to the container.

The present invention is of advantage in that the measuring system is capable of being calibrated more straightforwardly and easily by the user.

Optionally, in the method, the first state corresponds to the tank being substantially empty and devoid of liquid therein, and the second state corresponding to the tank being in a full state substantially filled with liquid.

Optionally, in the method, said substantially constant rate of liquid delivery is a substantially constant volumetric rate of liquid delivery. Surprisingly, most practical liquid supply apparatus, for example contemporary fuel or water pumps, are operable to supply at a quasi-constant rate.

Optionally, in the method, said known rate of liquid delivery is determined from knowledge of a substantially full liquid capacity of the container and a time interval between said first and second time instances. The full capacity is conveniently known from a substantially maximum allowable height of the liquid in the container.

Optionally, in the method, said container is a fuel tank, and said liquid is a combustible fuel for including in said fuel tank.

Optionally, in the method, said measurement system operable to measure said spatial position of said meniscus of said liquid included in said container is operable to employ a float which is operable to float on said meniscus for measuring said position.

Optionally, in step (c) of the method, said signal processing is implemented in a processor operable to determine a mathematical relationship between a volumetric portion of the container filled with liquid and the corresponding meniscus position indicative signal and to apply substantially said mathematical relationship so as to derive in said normal use said container liquid content signal indicative of a proportion of the container filled with the liquid. More optionally, in the method, said mathematical relationship is a polynomial approximation derived from said periodically recorded generated values of said meniscus position indicative signal.

Optionally, the method is adapted for use with a marine vessel wherein said container is a fuel tank of said marine vessel.

Optionally, in the method, said container is a fuel tank arrangement susceptible to being supplemented with one or more additional fuel tanks in liquid communication with said fuel tank arrangement, said method being repeatedly applicable in response to said fuel tank arrangement being supplemented or de-supplemented with said one or more additional tanks, so that said container liquid content signal is indicative of a proportion of the fuel tank arrangement and its one or more supplementary fuel tanks coupled thereto that are filled with the liquid.

Optionally, in the method, the first time instance is recorded by the measurement system as commencing when a threshold rate of change of the meniscus position indicative signal occurs after user activation of a calibrate input of the measurement system.

According to a second aspect of the invention, there is provided a measurement system operable to measure a spatial position of a meniscus of a liquid included within a container and therefrom generating a corresponding liquid content signal indicative of a proportion of the container filled with the liquid, said measurement system being operable to being calibrated:

(a) from a first time instance when said container is in a first state including a first quantity of liquid by progressively filling during a calibration phase said container with the liquid at a substantially constant rate of liquid delivery whilst simultaneously recording corresponding generated values of a meniscus position indicative signal generated by said measurement system;

(b) at a second time instance after said first time instance during said calibration phase, by terminating progressive filling of said container with said liquid when said position indicative signal corresponds to the container being in a second state including a second quantity of liquid; and (c) subsequently, in normal use after said calibration phase, by applying signal processing to said position indicative signal provided from the measurement system to generate said corresponding liquid content signal (410) indicative of said proportion of the container filled with the liquid, said signal processing accounting for said container during said calibration phase having been filled at the substantially constant rate of liquid delivery to the container.

Optionally, in the measurement system, said first state corresponds to the container being substantially in an empty state substantially devoid of said liquid, and said second state corresponds to the container being in a full state substantially filled with said liquid.

Optionally, in the measurement system, said container is a fuel tank and said liquid is a combustible fuel, said measurement system being adapted to measure fuel included within said fuel tank. More optionally, the measurement system is adapted for use in marine vessels.

According to a third aspect of the present invention, there is provided software on a data carrier, said software being executable on computing hardware for implementing a method according to the first aspect of the invention.

It will be appreciated that features of the invention are susceptible to being combined in any combination without departing from the scope of the invention as defined by the accompanying claims.

BRIEF DESCRIPTION OF THE DRAWINGS

By way of example only, embodiments of the present invention will now be described with reference to the accompanying drawings wherein.

DETAILED DESCRIPTION

Figure 1:
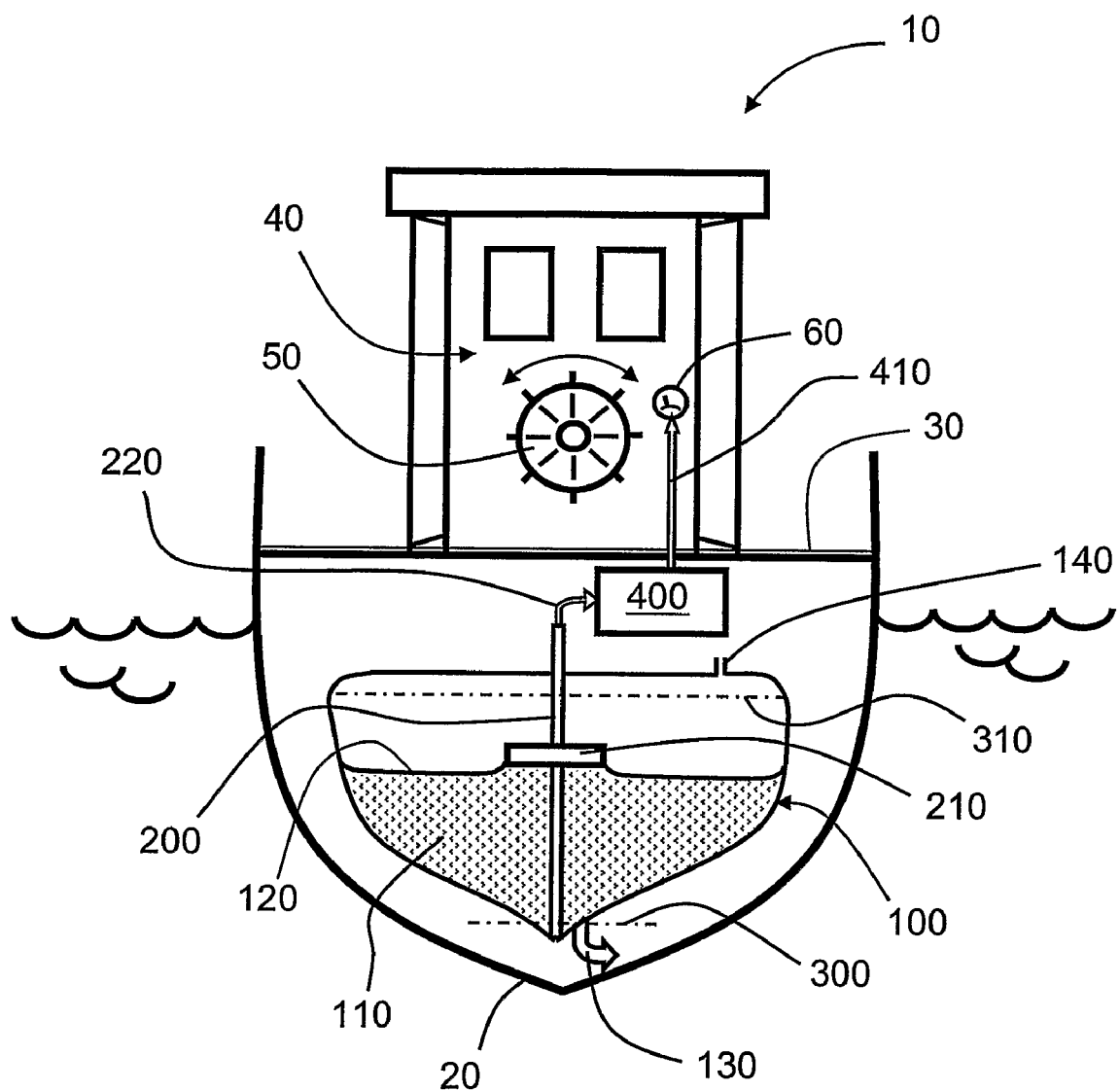
FIG. 1 is a schematic illustration of an embodiment of the present invention, the illustration including a depiction of a marine vessel provided with a tank for accommodating a liquid, for example water or fuel, a measuring sensor included within the tank for measuring a meniscus height of the liquid included within the tank and generating a corresponding meniscus height output signal, a data processor for receiving the meniscus height output signal and processing the signal to generate a tank liquid-content indicative signal for user presentation on a display wherein the display provides the user with an indication of a volumetric proportion of the tank filled with the liquid.

Referring to FIG. 1, there is shown a marine vessel, for example a yacht or fishing boat, indicated generally by 10. For purposes of implementing the present invention, the vessel 10 can be floating in water or alternatively supported on land. The vessel 10 includes a hull 20, an upper deck 30 attached to the hull 20 at an upper region thereof, and a user control cabin indicated by 40 built onto the upper deck 30. The control cabin 40 includes user operated controls 50, for example a rudder wheel, for steering and controlling a speed of the vessel 10 when in operation in water. Moreover, the control cabin 40 includes a display 60, for example a digital numerical display, a bar-graph display or a gauge-type dial display indicative in operation of a proportion of tank 100 of the vessel 10 filled with a quantity of a liquid 110. The liquid 110, by action of gravitational forces, collects at a lower region of the tank 100 and thereby forms an upper meniscus 120. The tank 100 is provided with an exit pipe 130 for providing a path by which a quantity of the liquid 110 can be removed from the tank 100, and an input pipe 140 for providing at least a partial degree of ventilation for the tank 100 and also for providing a path by which a quantity of the liquid 110 can be introduced into the tank 100.

A measurement sensor 200 is included in substantially a central region of the tank 100 so as to render the sensor 200 less affected by roll, pitch or yaw of the vessel 10 when in operation floating on water; such roll, pitch and yaw is susceptible to affecting the meniscus 120. The measurement sensor 200 can be implemented in various ways, for example:

(a) as a mechanical float-type gauge wherein a float 210 floats substantially on the meniscus 120 of the liquid 110, the float 210 moving relative to a substantially vertically orientated float-guide to generate a signal representative of spatial position of the float relative to the guide and hence an indication of a height of the meniscus 120 in the tank 100;

(b) as a wavelength-based sensor such as those utilizes reflected light or sound, for example reflections from the meniscus 120; or (c) an array sensor comprising a linear array of elements each operable to contribute to an output signal from the measurement sensor 200 and operable to exhibit a change of response from being immersed in the liquid 110 to being non-immersed in the liquid 110, for example an array of thermal-conductively sensitive elements.

The measurement sensor 200 is operable to generate a meniscus height output signal 220 which is coupled to a data processor 400. The data processor 400 can be implemented as digital hardware operable to execute software. Alternatively, the data processor 400 can be implemented using dedicated digital hardware, for example an application specific integrated circuit (ASIC). In operation, the data processor 400 generates a tank liquid-content indicative signal 410 for driving the aforementioned user display 60.

In operation, when quantities of the liquid 110 are extracted from the tank 10 via the exit pipe 130 such that the meniscus 120 is at a lower height 300, the tank 100 is deemed to be substantially empty, even if a relatively small residual of the liquid 110 is present below the lower height 300. Conversely, when quantities of the liquid 110 are added to the tank 100 via the input pipe 140 such that the meniscus 120 is at an upper height 310, the tank 100 is to be substantially full, even if a relatively small volume of space at an upper region of the tank 100 is not completely filled with the liquid 110. In operation, for example when the sensor 200 is implemented as a mechanical float gauge, the float 210 spatially moves between the lower height 300 and the upper height 310 in response to a proportion of the tank 100 filled with the liquid 110; the tank 100 is susceptible to being employed in a manner such that the float 210 moves between the upper height 310 and the lower height 300, although the float 210 may in normal circumstances move in a smaller range between these heights 300, 310 in response to tank filling operations and extractions of quantities of the liquid 110 from the tank 100.

Figure 2:
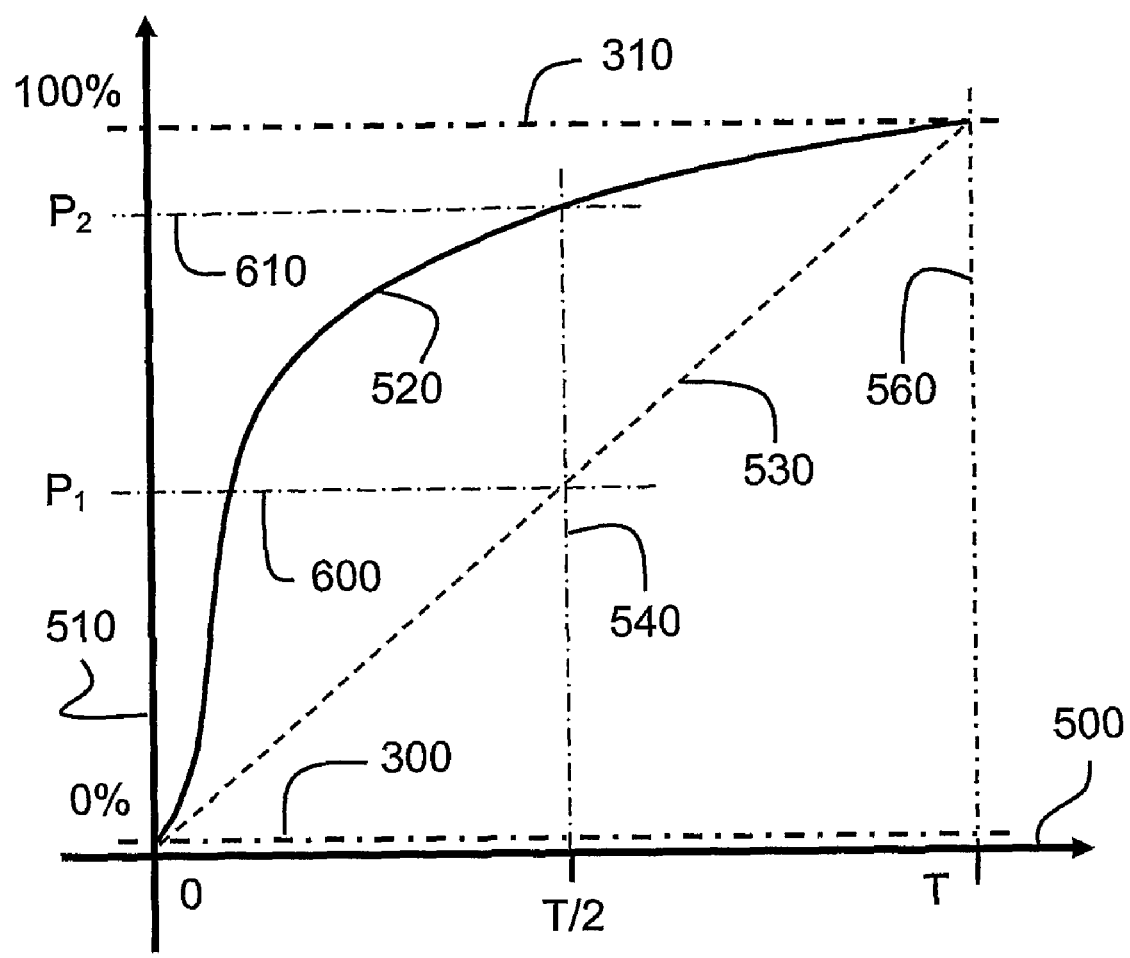
FIG. 2 is a schematic graph of sensing characteristics of the measuring sensor illustrated in FIG. 1.

In operation, the tank 100 is potentially of a complex peripheral shape when installed in the marine vessel 10. For example, as depicted in FIG. 1, the tank 10 is relatively wider at an upper portion thereof near to the upper height 310, and tapers towards a narrower lower point on approach to the lower height 300. In consequence of such a complex peripheral shape for the tank 100, the meniscus height output signal 220 varies with a volume of the liquid 110 included within the tank 100 in a manner as depicted in FIG. 2. FIG. 2 will now be elucidated in respect of a method of the present invention.

In FIG. 2, there is shown a graph comprising an abscissa axis 500 denoting increasing time from left to right, and an ordinate axis 510 denoting increasing meniscus height output signal 220 from bottom to top of the ordinate axis 510. Values of the output signal 220 corresponding to the float 210 being at the lower and upper heights 300, 310 are denoted by "0%" and "100%" respectively. On the abscissa axis 500, there is marked a first time instance denoted by "0", and a second time instance denoted by "T".

The method of the invention employs a calibration routine to calibrate the sensor 200, the data processor 400 and the display 60 so that the display 60 provides a substantially accurate indication to the user (not shown) of a proportion of the tank 100 which is filled with the liquid 110. The calibration routine commences at the first time instance at a time t=0 and terminates at the second time instance when t=T; a calibration period thereby exists between the first and second time instances. At the first time instance, the float 210 is arranged to be at a lower position; for example, the tank 100 is arranged to be substantially empty so that the meniscus 120 is substantially at the lower height 300. The present invention is however not limited to the sensor 200 being calibrated between states of the tank 100 being substantially empty and substantially full; for example, the sensor 200 can be calibrated in a plurality of calibration steps whose calibration results are subsequently combined to provide calibration of the sensor 200 over a correspondingly larger range.

During the calibration period, a source of liquid, for example a nozzle of a hose of a fuel filling pump, is coupled to the input pipe 140, and activated to fill the tank 100 so that the meniscus 120 rises from the aforesaid lower position, for example the lower height 300, to an upper position, for example to the aforesaid upper height 310, progressively during the calibration period. Of significance to the present invention is that, in practice, most fuel delivery systems or water delivery systems provided for marine vessels, for example in harbors, dispense at a substantially constant rate during the calibration period; in other words, the filling rate is quasi-constant during the calibration period. For implementing the method of the invention, it is not necessary to measure or know the rate of delivery in contradistinction to known contemporary approaches to measurement calibration. For implementing the present invention, it is merely necessary to know beforehand one or more of:

(a) a given volumetric capacity K of the tank 100 corresponding to the meniscus 210 being at the upper position, for example at the upper height 310;

(b) a duration of the calibration period, namely a period T, and a rate of delivery of the liquid 110 to the tank 100; the period T can be measured in a simple manner using a stopwatch or similar; and (c) the position of the meniscus 120 at the lower and upper position over which calibration is desired.

For example, the tank 100 can be calibrated in option (c) above simply by monitoring the position of the meniscus and assuming that rate of liquid 110 to the tank 100 is quasi-constant during calibration.

A rate R of filling of the tank 100 can simply be derived from Equation 1 (Eq. 1):

$$R = \frac{K}{T} \qquad \text{Eq. 1}$$

During the calibration period, a volume V of liquid in the tank 10 at a given instance t during the period can be computed from Equation 2 (Eq. 2):

$$V(t) = \int_0^t R \, dt = t \int_0^t \frac{K}{T} \, dt \qquad \text{Eq. 2}$$

On account of R being substantially constant during the calibration period, namely substantially quasi-constant, Equation 2 simplifies to Equation 3 (Eq. 3):

$$V(t) = \frac{Kt}{T} \qquad \text{Eq. 3}$$

The meniscus height output signal 220 represented by h is related to the volume V(t) of liquid in the tank 100 by way of polynomial function P as provided in Equation 4 (Eq. 4):

$$h(t) = P[V(t)] \qquad \text{Eq. 4}$$

wherein the polynomial P is defined by Equation 5 (Eq. 5):

$$P[V] = p_0 + p_1 V + p_2 V^2 + p_3 V^3 + \quad \text{Eq. 5}$$

During the calibration period, the data processor 400 is operable to periodically record complementary sets of values of V(t) and h(t) and then at completion of the calibration period perform a numerical calculation, for example a least-squares computation, to determine the coefficients px of the polynomial P; during the calibration period, V(t) is calculable from Equation 3 (Eq. 3) and does not need to be measured in contradistinction to known approaches, namely only values h of the signal 220 as a function of time t need to be periodically recorded in the data processor 400 during the calibration period.

The polynomial P is effectively depicted in FIG. 2 by a curve 520 which initially rises rapidly with increasing time along the abscissa axis 500 on account of the a lower tapering of the tank 100 and then substantially asymptotically approaches a value corresponding to the meniscus 210 being at the upper height 310. For example at a time T/2 during the calibration period, the curve 520 is at a value P2 denoted by a line 610 whereas the tank 100 is only half full at T/2. Hypothetically, were the tank 100 to be of simple cubic form, the signal 220 would be a linear function of the volume V of liquid in the tank 100 and would give rise to a sensing characteristics as denoted by a line 530; in such case, the tank 100 being half full at a time T/2 would result in the signal 220 corresponding to a value Pi denoted by a line 600.

After the calibration period as depicted in FIG. 2, the data processor 400 is operable to determine the coefficients px of the polynomial P and then determine a corresponding inverse function P'''1. In normal operation after the calibration period, the meniscus 120 of the liquid 110 can be at some height h between the lower and upper heights 300, 310 respectively in response to the given instantaneous volume V of the liquid 110 in the tank 100. Thus, In normal operation, the data processor receives the signal 220 indicative of height h of the float 210 and hence the meniscus 120 and applies the inverse function P'''1 to generate the tank liquid-content indicative signal 410 denoted by U for driving the aforementioned user display 60 as described by Equation 6 (Eq. 6):

$$U = P^{-1}(h) \quad \text{(Eq. 6):}$$

In implementing the present invention in practice, the user firstly needs to ensure that the tank 100 is in a first state whereat the float 210 is at the aforesaid lower position, for example tank 100 is substantially empty. Next, the user needs to key into the data processor, for example via a key-pad of the data processor 400, one or more of the following:

(a) a measure of the capacity of the tank 100 between the aforementioned upper and lower positions of the float 210;

(b) a rate of delivery of liquid 110 into the tank 100; and (c) details regarding the upper and lower positions of the float 210 over which calibration is to be executed.

Thereafter, the user presses a switch of the data processor to the define commencement of the calibration period simultaneously with commencing supplying liquid to the tank 100. When the tank 100 has been filled to a desired extent such that the float 210 is at the aforementioned upper position, for example the tank 100 is full whereat the signal 220 reaches a maximum corresponding to h being substantially equal to the upper height 310, the data processor 400 takes such a situation to be an end of the calibration period and optionally provides the user with an optical or audio warning that the tank 100 is filled to a desired extent so that the user ceases supply of liquid to the tank 100. The data processor 400 then proceeds to compute coefficients of the polynomial P and therefrom corresponding coefficients of the inverse polynomial P'1, or alternatively computes coefficients of the inverse polynomial P'''1 directly also by numerical analysis such as least-squares analysis, and thereby is in normal operation operable to implement the computation denoted by Equation 6 (Eq. 6) and thereby provide on the display 60 a substantially accurate measure of a volume of liquid 110 included at any instance after the calibration period in the tank 100.

Figure 3:
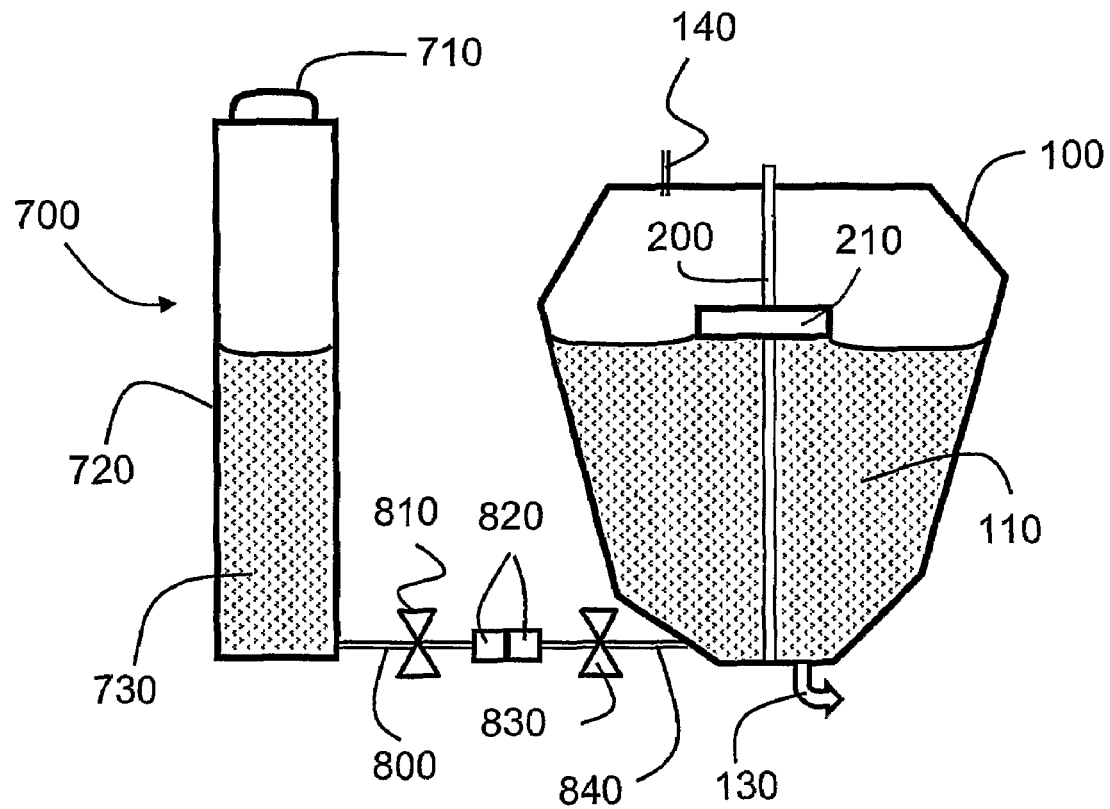
FIG. 3 is a schematic illustration of the tank of FIG. 1 supplemented with an optionally additional tank.

In certain circumstances, the user desires to supplement the tank 100 with one or more subsidiary tanks, for example to carry more fuel on board the marine vessel 10 to execute a longer sailing journey than normal at a sacrifice of available living space onboard the vessel 10. Thus, as depicted in FIG. 3, there is optionally included in the vessel a subsidiary tank indicated generally by 700. The subsidiary tank 700 includes an outer wall 720 for include a quantity of liquid denoted by 730. The tank 700 is provided at a lower region thereof with a first coupling pipe 800 including therealong a first control valve 810 and a first part of a detachable coupler 820. Similarly, the tank 100 includes at a corresponding lower region thereof a second coupling pipe 840 including therealong a control valve 830 and a second part of the detachable coupler 820, When the tanks 100, 700 are not mutually coupled, the first and second valves 810, 840 are in a closed state and the first and second part of the detachable coupler 820 are spatially detached. When coupling the tanks 100, 700 together, the two parts of the detachable coupler 820 are mated and then the first and second valves 810, 820 are opened to enable liquid communication between the tanks 100, 700. Optionally, the valves 810, 820 can be integrated into the detachable coupler 820 so that they are opened to enable liquid communication between the tanks 100, 700 only when the parts of the coupler 820 are mated together; the valves 820 would then be closed when the parts of the coupler 800 are detached from one another.

Coupling of the tanks 100, 700 together affects calibration of the data processor 400 which is beneficially recalibrated to reflect a combined volumetric capacity of the tanks 100, 700. On account of the tanks 100, 700 potentially being of mutually different shape, the polynomial P is potentially considerably modified. The method of the invention enables the user to readily calibrate the data processor 400 for a first situation of the tank 100 alone being included in the vessel 10, and a second situation of both of the tanks 100, 700 being present in mutual liquid communication in the vessel 10. Optionally, the data processor 400 is provided with memory for storing calibration data corresponding to first and second situations so that the user can merely select therebetween by using switches on the data processor 400 when subsequently, after performing calibrations for the two situations, coupling and de-coupling the subsidiary tank 700 from the tank 100. The display 60 is thereby capable of providing accurate measurement results for the first and second situations.

The present invention can be applied virtually irrespective of complexity of shape of the tanks 100, 700 and without specific knowledge of geometries of the tanks 100, 700. Moreover, the present invention can be conveniently implemented during normal refueling or refilling operations, either in service or during initial manufacturing of the vessel 10.

Optionally, during the calibration period, the user firstly depresses a switch on the data processor 400, for example a "calibrate" switch, when the user is desirous to perform a calibration routine. The data processor 400 then waits and only assumes commencement of the calibration period, namely t=0, when the signal 220 begins to start increasing, namely when the user has had time to walk from the data processor 400 to apply a refueling hose to the input pipe 140 and pull a trigger of the hose when actually refilling commences. Such an intelligent recognition of commencement of the calibration period renders the data processor 400 especially straightforward for the user to use during calibration. Thus, the data processor 400 can be optionally implemented with simple controls, for example with a keypad for indicating a full capacity of the tank 100, or the tanks 100, 700 as appropriate, for example a maximum value of the signal 220 "h" corresponding to the upper height 310, a "calibrate" switch and optionally one or more configuration switches for coping with various tank configurations. The data processor 400 is thus potentially relatively easy for the user to operate, namely is "user friendly".

Optionally, the data processor 400 is included as part of an electronic data control system included on the vessel 10. Such a data control system can also provide other functions such a vessel engine management, environmental comfort control on board the vessel 10, a safety warning, a collision hazard warning just to mention a few examples. Moreover, the control system can be included within the vessel 10 by way of an associated CAN bus coupled to various sensors, actuators, valves, sounders, displays and so forth included on the vessel 10.

In the foregoing, it will be appreciated that the present invention relies on supply of fluid 110 to the tank being quasi-constant during filling of the tank 100. This characteristic has not been hitherto appreciated and utilized effectively for calibration, thereby distinguishing the present invention from known contemporary approaches.

Modifications to embodiments of the invention described in the foregoing are possible without departing from the scope of the invention as defined by the accompanying claims.

Expressions such as "including", "comprising", "incorporating", "consisting of, "have", "is" used to describe and claim the present invention are intended to be construed in a non-exclusive manner, namely allowing for items, components or elements not explicitly described also to be present. Reference to the singular is also to be construed to relate to the plural.

Numerals included within parentheses in the accompanying claims are intended to assist understanding of the claims and should not be construed in any way to limit subject matter claimed by these claims.

The invention claimed is:

1. A method of calibrating a measurement system operable to measure a spatial position of a meniscus of a liquid included within a container and therefrom generating a corresponding liquid content signal indicative of a proportion of the container filled with the liquid, the method including steps of:
   (a) from a first time instance when the container is in a first state including a first quantity of the liquid, progressively filling during a calibration phase the container with the liquid at a substantially constant volumetric rate, which rate is unknown, of liquid delivery whilst periodically simultaneously recording corresponding generated values of a meniscus position indicative signal generated by the measurement system;
   (b) at a second time instance after the first time instance during the calibration phase, terminating progressive filling of the container with the liquid when the position indicative signal corresponds to the container being in a second state including a second quantity of the liquid; and
   (c) determining the position of the meniscus at one of (a) a lower and upper position over which calibration is desired and (b) a given volumetric capacity K of the container corresponding to the meniscus being at an upper position; and
   (d) subsequently, in normal use after the calibration phase, applying signal processing to the position indicative signal provided from the measurement system to generate the corresponding liquid content signal indicative of the proportion of the container filled with the liquid, the signal processing accounting for the container during the calibration phase having been filled at the substantially constant volumetric rate of liquid delivery to the container.

2. A method as claimed in claim 1, wherein the position of the meniscus is determined at the lower and upper position over which calibration is desired and the first state corresponds to the tank being substantially empty and devoid of liquid therein, and the second state corresponding to the tank being in a full state substantially filled with liquid.

3. A method as claimed in claim 1, wherein the container is a fuel tank, and the liquid is a combustible fuel for including in the fuel tank.

4. A method as claimed in claim 1, wherein the measurement system operable to measure the spatial position of the meniscus of the liquid included in the container is operable to employ a float which is operable to float on the meniscus for measuring the position.

5. A method as claimed in claim 1, wherein in the step (c) the signal processing is implemented in a processor operable to determine a mathematical relationship between a volumetric portion of the container filled with liquid and the corresponding meniscus position indicative signal and to apply substantially the mathematical relationship so as to derive in the normal use the container liquid content signal indicative of a proportion of the container filled with the liquid.

6. A method as claimed in claim 5, wherein the mathematical relationship is a polynomial approximation derived from periodically recorded generated values of the meniscus position indicative signal.

7. A method as claimed in claim 1 adapted for use with a marine vessel wherein the container is a fuel tank of the marine vessel.

8. A method as claimed in claim 1, wherein the container is a fuel tank arrangement susceptible to being supplemented with one or more additional fuel tanks in liquid communication with the fuel tank arrangement, the method being repeatedly applicable in response to the fuel tank arrangement being supplemented or desupplemented with the one or more additional tanks, so that the container liquid content signal is indicative of a proportion of the fuel tank arrangement and its one or more supplementary fuel tanks coupled thereto that are filled with the liquid.

9. A method as claimed in claim 1, wherein the first time instance is recorded by the measurement system as commencing when a threshold rate of change of the meniscus position indicative signal occurs after user activation of a calibrate input of the measurement system.

10. A measurement system operable to measure a spatial position of a meniscus of a liquid included within a container and therefrom generating a corresponding liquid content signal indicative of a proportion of the container filled with the liquid, the measurement system being operable to being calibrated:
   (a) from a first time instance when the container is in a first state including a first quantity of liquid by progressively filling during a calibration phase the container with the liquid at a substantially constant rate, which rate is unknown, of liquid delivery whilst simultaneously recording corresponding generated values of a meniscus position indicative signal generated by the measurement system;

(b) at a second time instance after the first time instance during the calibration phase, by terminating progressive filling of the container with the liquid when the position indicative signal corresponds to the container being in a second state including a second quantity of liquid;

(c) determine the position of the meniscus at one of (a) a lower and upper position over which calibration is desired and (b) a given volumetric capacity K of the container corresponding to the meniscus being at an upper position; and (d) subsequently, in normal use after the calibration phase, by applying signal processing to the position indicative signal provided from the measurement system to generate the corresponding liquid content signal indicative of the proportion of the container filled with the liquid, the signal processing accounting for the container during the calibration phase having been filled at the substantially constant rate of liquid delivery to the container.

11. A measurement system as claimed in claim 10, wherein the position of the meniscus is determined at the lower and upper position over which calibration is desired and the first state corresponds to the container being substantially in an empty state substantially devoid of the liquid, and the second state corresponds to the container being in a full state substantially filled with the liquid.

12. A measurement system as claimed in claim 11, wherein the container is a fuel tank and the liquid is a combustible fuel, the measurement system being adapted to measure fuel included within the fuel tank.

13. A measurement system as claimed in claim 11 adapted for use in marine vessels.

14. A non-transitory computer readable medium comprising software for implementing a method as claimed in claim 1.

* * * * *